Nov. 17, 1964

A. A. HEYMAN 3,157,134

MACHINE FOR FORMING FLAT TOP ROLLED ICE CREAM CONTAINERS

Filed March 5, 1962

INVENTOR
ALBERT A. HEYMAN

BY *Albert J. Kramer*

ATTORNEY

Nov. 17, 1964
A. A. HEYMAN
3,157,134
MACHINE FOR FORMING FLAT TOP ROLLED ICE CREAM CONTAINERS
Filed March 5, 1962
8 Sheets-Sheet 2
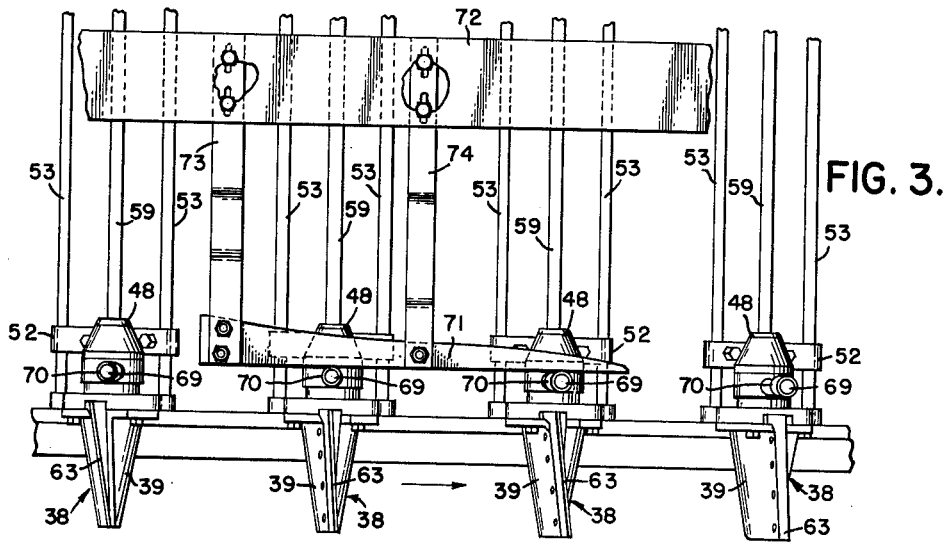
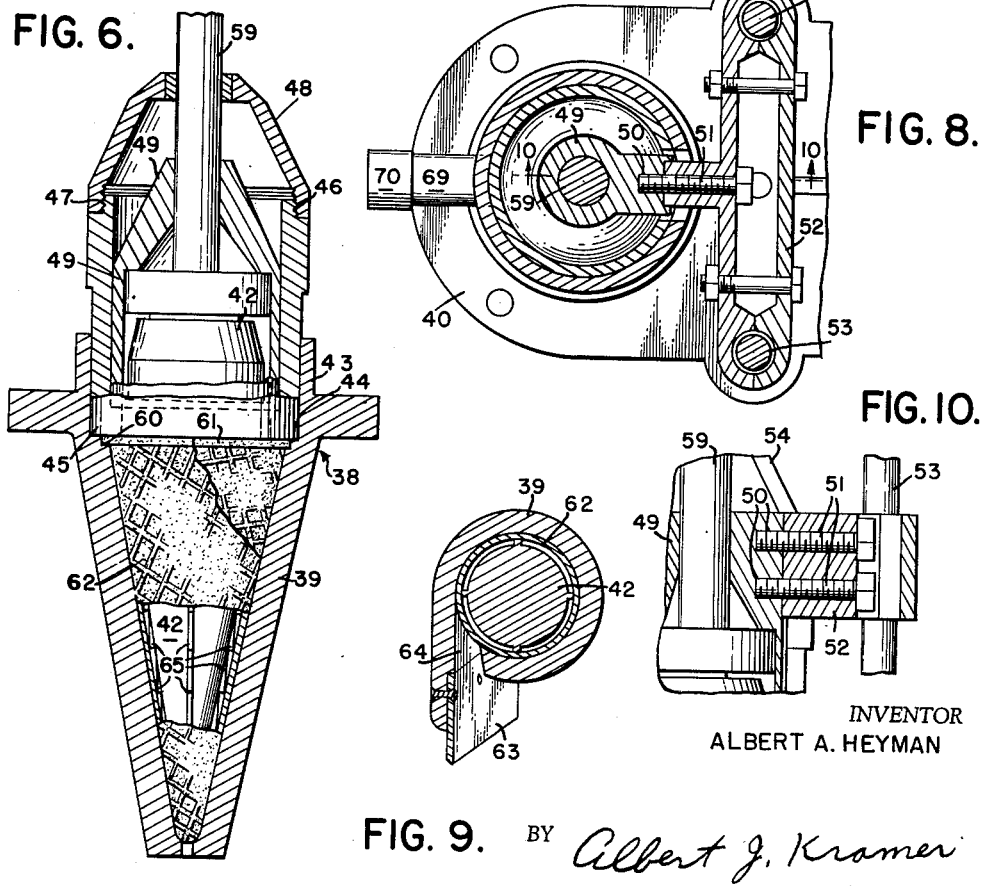
INVENTOR
ALBERT A. HEYMAN
BY *Albert J. Kramer*
ATTORNEY

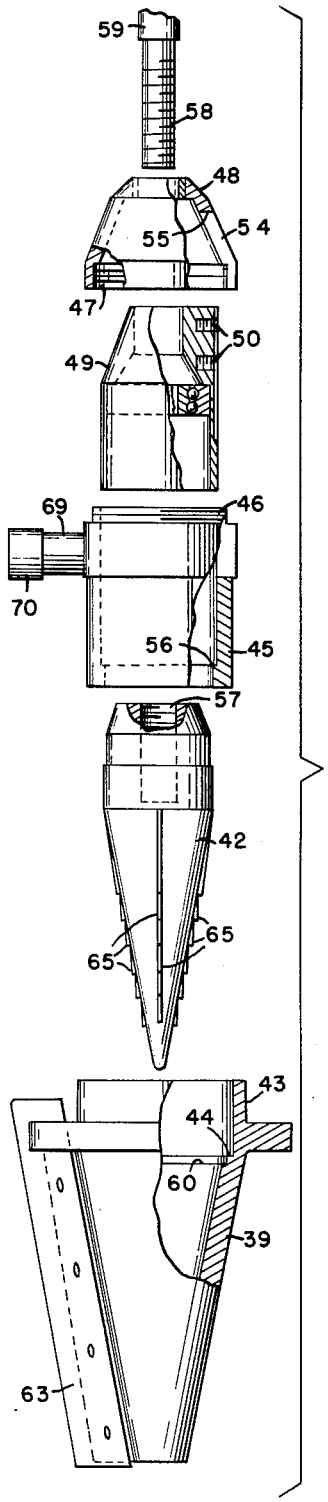
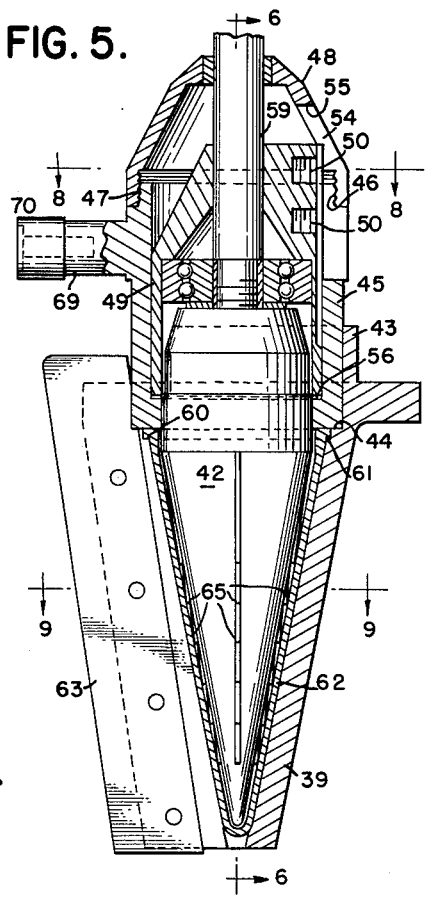
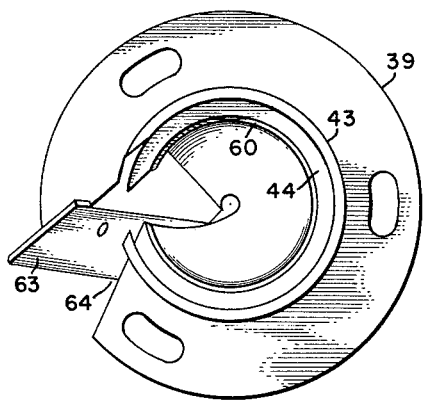
FIG. 4.
FIG. 5.
FIG. 7.
INVENTOR
ALBERT A. HEYMAN
BY Albert J. Kramer
ATTORNEY Nov. 17, 1964
A. A. HEYMAN
MACHINE FOR FORMING FLAT TOP ROLLED ICE CREAM CONTAINERS
3,157,134
Filed March 5, 1962
8 Sheets-Sheet 4
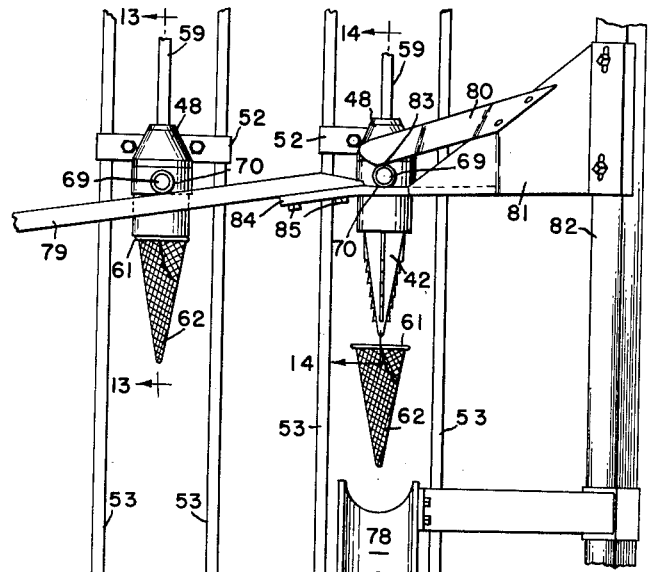
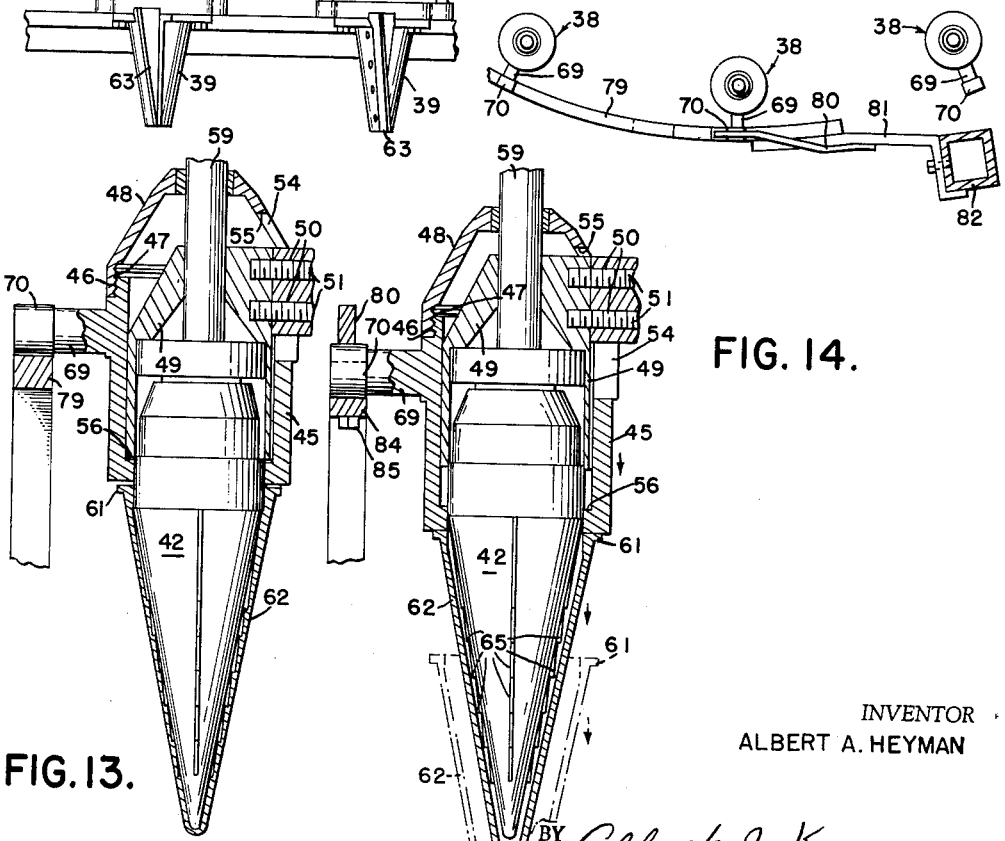
INVENTOR
ALBERT A. HEYMAN
BY *Albert J. Kramer*
ATTORNEY

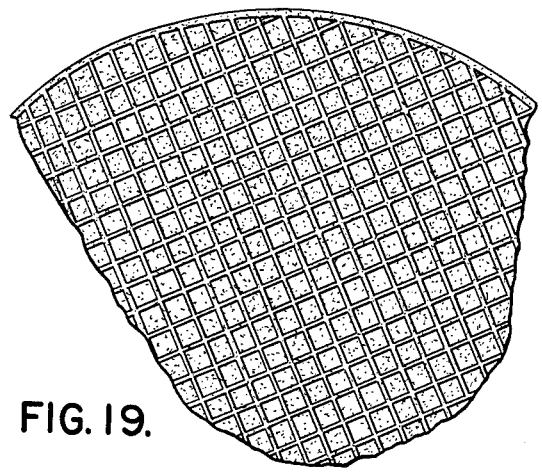
FIG. 19.
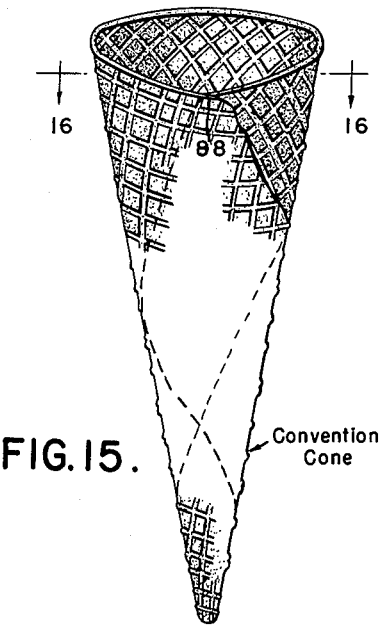
FIG. 15.
Conventional Cone
FIG. 17.
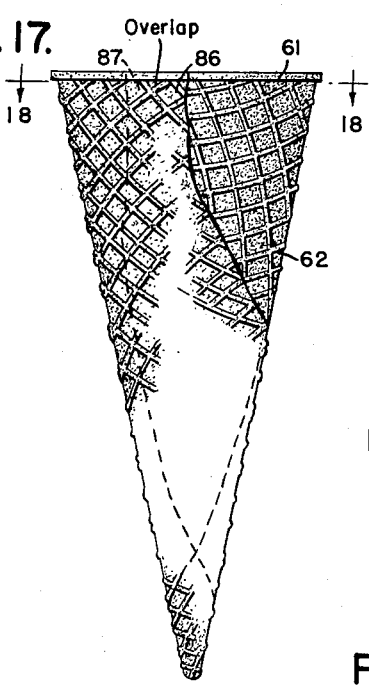
FIG. 16.
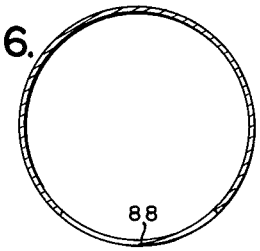
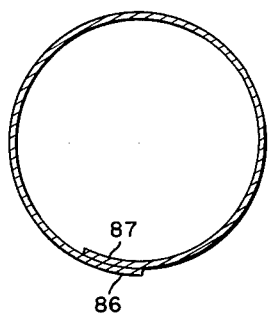
FIG. 18.
INVENTOR
ALBERT A. HEYMAN
BY Albert J. Kramer
ATTORNEY

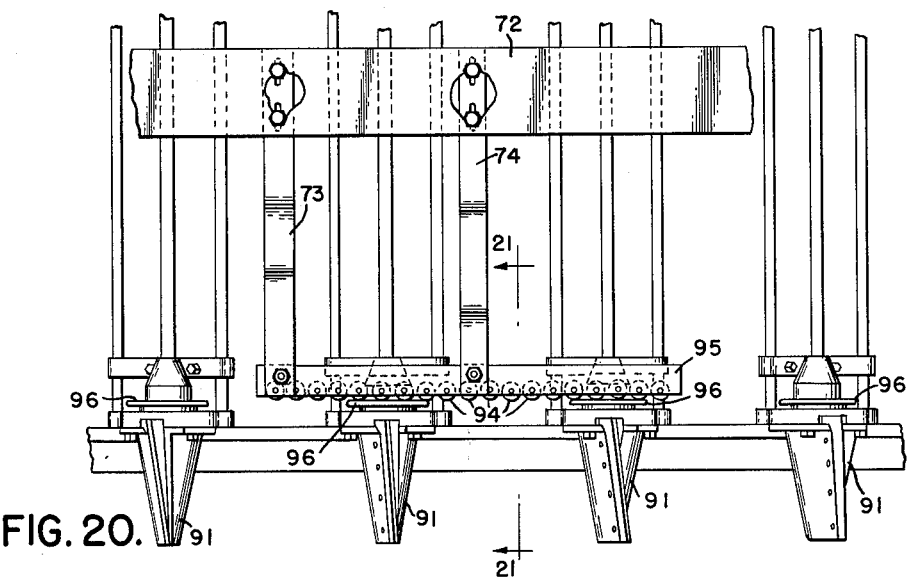
FIG. 20.
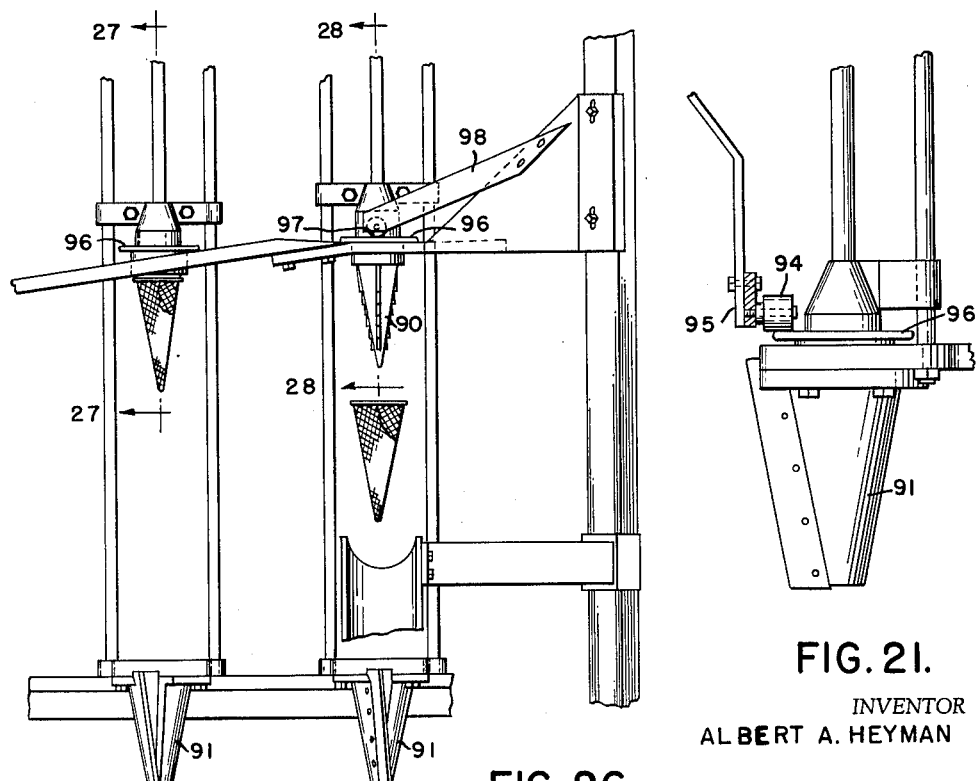
FIG. 26.
FIG. 21.
INVENTOR
ALBERT A. HEYMAN

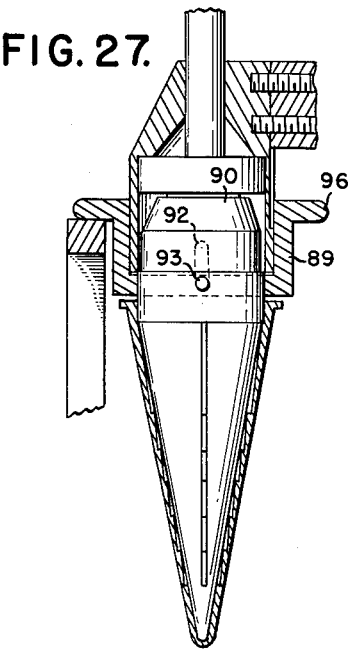
FIG. 27.
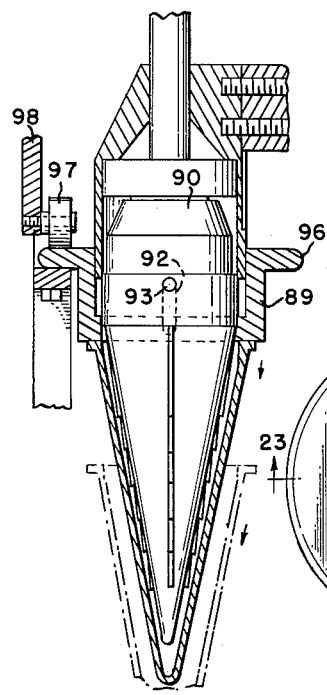
FIG. 28.
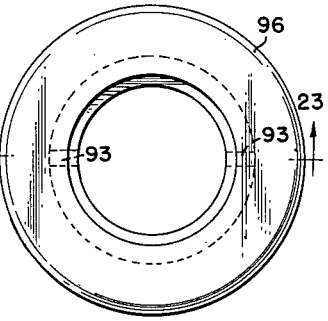
FIG. 22.
FIG. 24.
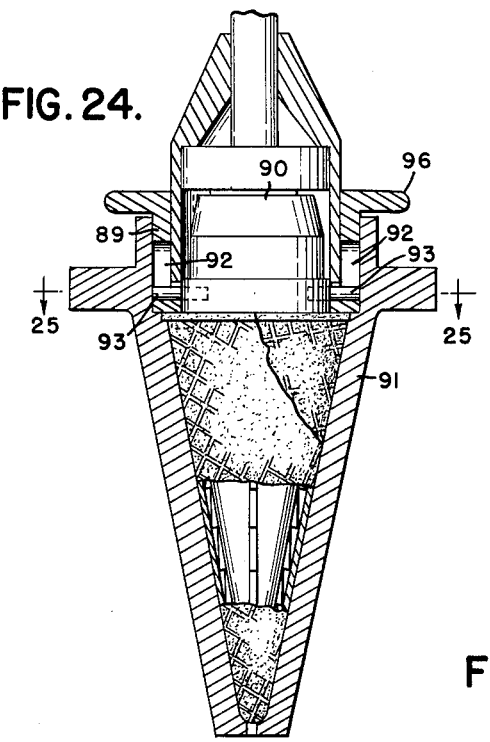
FIG. 23.
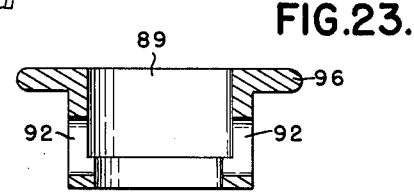
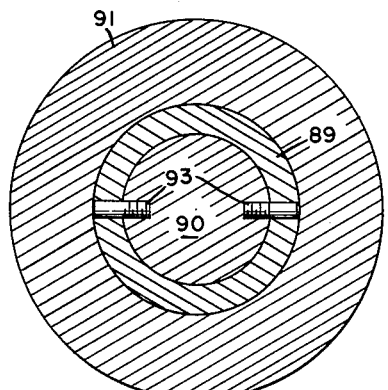
FIG. 25.
INVENTOR.
ALBERT A. HEYMAN
BY
*Albert J. Kramer*
ATTORNEY Nov. 17, 1964 — A. A. HEYMAN — 3,157,134
MACHINE FOR FORMING FLAT TOP ROLLED ICE CREAM CONTAINERS
Filed March 5, 1962 — 8 Sheets-Sheet 8

INVENTOR.
ALBERT A. HEYMAN
BY *Albert J. Kramer*
ATTORNEY

United States Patent Office 3,157,134
Patented Nov. 17, 1964

3,157,134
MACHINE FOR FORMING FLAT TOP ROLLED
ICE CREAM CONTAINERS
Albert A. Heyman, Baltimore, Md., assignor to The Maryland Baking Company, Baltimore, Md., a corporation of Maryland
Filed Mar. 5, 1962, Ser. No. 177,653
15 Claims. (Cl. 107—4)

This invention relates to the manufacture of ice cream containers and it is more particularly concerned with a machine for manufacturing rolled pastry containers in which the top or rim of the container is flat, that is, in a plane at right angles to its longitudinal axis.

In the manufacture of rolled pastry containers, it has heretofore not been possible to provide them with a flat top as in the case of the molded type of pastry containers, that is, containers made by pouring a fluid pastry batter into molds and baking them in the mold until they are rigid. Instead, the rim of the conventional rolled container is uneven, slanted and irregular in shape being more in the nature of a sloping ellipse. As a consequence, scoops of ice cream placed on the rim of such containers are not firmly and evenly supported thereby but, on the contrary, are poised at an angle with varying degrees of exposure of the ice cream from the side. This condition renders a scoop of ice cream easy to unseat from the container, especially by children who are not conscious of the problem involved. Also, the ice cream tends to melt faster at the more exposed surfaces so that the side where the rim is lowermost frequently becomes overrun with liquid ice cream before the ice cream can be eaten to a point below the rim level.

Such rolled containers of the prior art are also deficient in that the rim is not provided with a beaded edge to strengthen it. Only the terminal unbeaded edge of the wafer from which it was rolled exists. Since the wafer is not usually of uniform thickness, this unbeaded edge is thinner at some points than the others which results in it being especially susceptible to breakage both in nested relation with other containers and in actual use where some pressure must be applied to it in placing the scoops of ice cream thereon.

The general objects of the invention comprise the manufacture of a rolled pastry container that obviates the deficiencies of the prior art explained above and the provision of a machine for its manufacture.

A specific object of the invention is the manufacture of a rolled pastry container having a flat top and to provide a machine for manufacturing it.

Another specific object is the provision of a flat top rolled pastry container having a beaded edge and of a machine for manufacturing it.

A further object is the provision of such a machine which is essentially automatic in operation.

These and still further objects, advantages and features of the invention will appear more fully from the following description considered together with the accompanying drawings.

In the drawings:

FIG. 3 is a fragmentary elevational view of the lower part of the turret unit of the machine as viewed from the left side of FIG. 1.

FIG. 4 is an exploded view of the mold parts comprising one of the rolling units of the machine partially broken away.

FIG. 5 is a vertical cross-sectional view of an assembled rolling unit together with a formed cone therein.

FIG. 6 is a sectional view along the line 6—6 of FIG. 5.

FIG. 7 is a top plan view of the female mold part of a rolling unit.

FIG. 8 is a sectional view along the line 8—8 of FIG. 5.

FIG. 9 is a sectional view along the line 9—9 of FIG. 5.

FIG. 10 is a sectional view along the line 10—10 of FIG. 8.

FIG. 11 is a fragmentary elevational view of the lower portion of the turret unit as viewed from the right side of FIG. 1.

FIG. 12 is a schematic plan view of the stripper track in relation to the rolling units.

FIG. 13 is a sectional view along the line 13—13 of FIG. 11.

FIG. 14 is a sectional view along the line 14—14 of FIG. 11.

FIG. 15 is a side elevational view of a form of rolled pastry cone typical of the prior art.

FIG. 16 is a plan sectional view along the line 16—16 of FIG. 15.

FIG. 17 is a side elevational view of a rolled pastry cone in accordance with this invention.

FIG. 18 is a plan sectional view along the line 18—18 of FIG. 17.

FIG. 19 is a top face view of a baked wafer having a configuration adapted to form with the machine a rolled cone according to this invention as illustrated in FIGS. 17 and 18.

FIG. 20 is a view similar to FIG. 1 of a modified embodiment of the invention.

FIG. 21 is an elevational view partly in section along the line 21—21 of FIG. 20.

FIG. 22 is a top plan view of the flanged element of the modified embodiment apart from the embodiment as a whole.

FIG. 23 is a vertical sectional view along the line 23—23 of FIG. 22.

FIG. 24 is a vertical cross-sectional view of an assembled rolling unit of the modified embodiment together with a formed cone therein, the cone being partly broken away.

FIG. 25 is a plan sectional view along the line 25—25 of FIG. 24.

FIG. 26 is a view similar to FIG. 11 of the modified embodiment.

FIG. 27 is a vertical sectional view along the line 27—27 of FIG. 26.

FIG. 28 is a vertical sectional view along the line 28—28 of FIG. 26.

Figure 1:
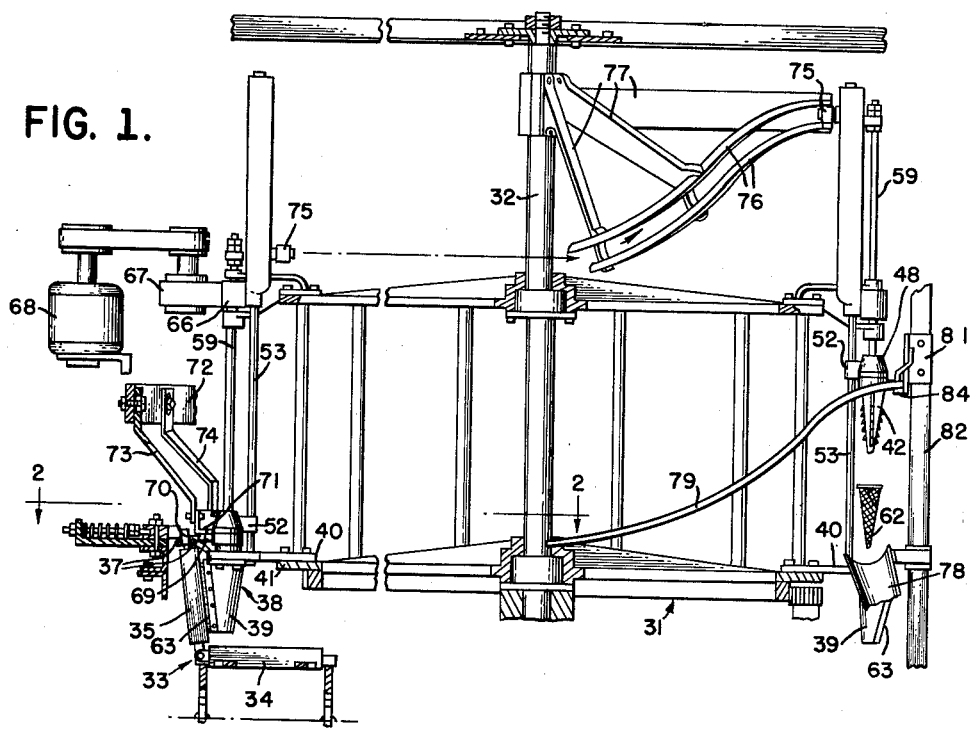
FIG. 1 is a fragmentary front elevational view of a machine of the prior art used to manufacture rolled pastry cones, containing modifications pertinent to one embodiment of this invention.
Figure 2:
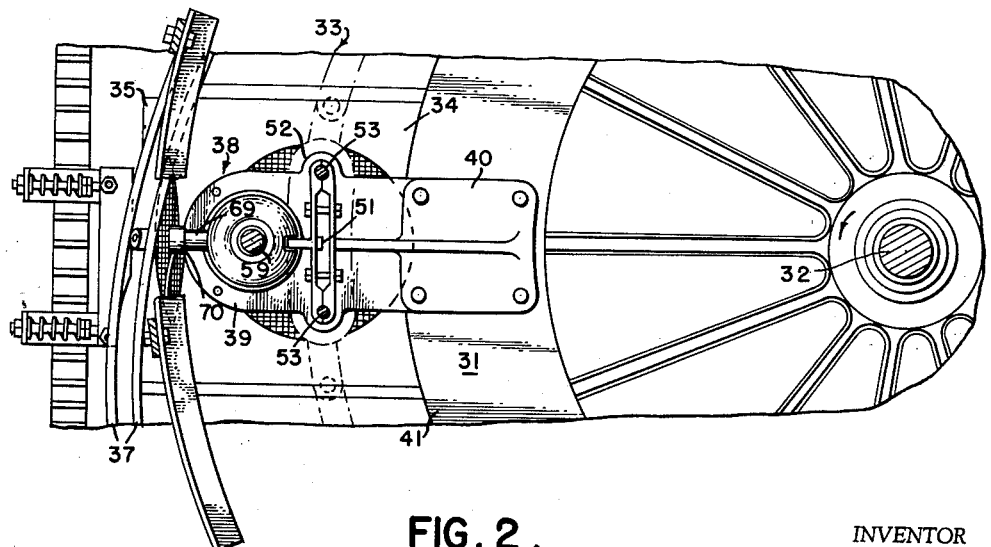
FIG. 2 is a fragmentary plan sectional view generally along the line 2—2 of FIG. 1 on a larger scale.

The machine of the present invention is essentially a modification of the one illustrated and described in U.S. Patent No. 2,745,363 to which reference is here made for details in construction which may be necessary to complete the description of the structure and in which a rotating wheel or turret 31 is mounted on a stationary post 32 adjacent to a chain of waffle irons 33.

The waffle irons comprise a lower base griddle 34 and an upper hinged lid griddle 35 between which the batter is baked in passing through an oven (not shown) to form a hot pliable wafer 36 that can be molded in the shape of a cone. The lid griddle 35 is opened to an upright position by a double track 37 and being thus opened it is positioned for transfer of the wafer therein into one of the rolling units 38 of the turret at the transfer station.

The turret 31 carries a series of such rolling units at its lower periphery each unit comprising a female mold part 39 attached to a bracket 40 at the rim 41 of the turret.

The rolling unit also comprises a male mold part or spinner 42 adapted to rotate within the female part.

The female mold part 39 has a cylindrical upper portion 43 integral with the lower conical portion. The thickness of the wall of the upper portion 43 is reduced relative to the thickness of the wall of the lower portion to provide an upwardly facing annular seat 44 for the lower end of a sleeve 45 that fits inside the upper portion 43 about the upper end of the spinner 42.

The upper end of the sleeve 45 is provided with external threads 46 to engage the internal threads 47 of a hollow cap 48. Within the sleeve 45 and cap 48 there is disposed a vertical slidable member 49 having threaded apertures 50 for attachment by bolts 51 to a bracket 52, each slidably mounted on a pair of vertical rods 53 of the turret. The cap 48 has an opening 54 to expose the apertures 50 for this purpose. The opening 54 also provides a downwardly facing shoulder 55 to abut the upper end of the member 49 in its uppermost position relative thereto, the lowermost relative position being determined by the abutment of its lower end against an annular upwardly facing shoulder 56 of the sleeve 45 adjacent the spinner 42.

The spinner 42 has a threaded bore 57 at the top to engage the lower threaded end 58 of a vertical spinner rod 59. The rod passes downwardly through the cap 48, member 49, and sleeve 45.

The wall of the female mold part 39 just below the sleeve 45 is rabbeted on the inside to provide an annular recess 60 that forms from the wafer the beaded rim 61 of the cone 62.

The female mold part comprises the conventional transfer blade 63 for engaging the wafer on the upper griddle 35 and a slotted opening 64 through which the wafer is passed to the inside to engage the spinner 42. The spinner 42 has the conventional fins 65 on its lateral surface to provide a positive non-slip engagement with the wafer as it enters the mold to be spun.

The spinner is rotated by means of a roller 66 attached to the rod 59 at the upper end that passes adjacent to and engages a belt 67 driven by a motor 68 on the side of the turret above the wafer transfer station.

The formation of the rim 61 requires that the sleeve 45 be held against relative movement on the female mold part while the wafer is being drawn inside at the transfer station because of the molding pressure required to form it. This is accomplished by means of a horizontal finger 69 integral with the sleeve and projecting outwardly therefrom. The outer end of the finger 69 is provided with a roller 70 which at the said transfer station engages the bottom edge of a stationary hold down bar 71. The said bar 71 is mounted on a frame member 72 by means of brackets 73 and 74 or by any other suitable means.

The spinner rod 59 of each rolling unit is provided with a cam roller 75 at its upper end which is adapted to enter an inclined camway 76 mounted on radial arms 77 attached to the stationary post 32 the purpose of which is to elevate the spinner 42 out of the female mold part after the cone has been formed therein, to a position above a discharge station where a chute 78 is located to receive from the spinner the finished cones, this part of the machine being essentially common to that described in said Patent No. 2,745,363 to which reference is made for a fuller description thereof.

The discharge of the finished cones from the spinner is effected by means of a stationary stripper track 79 on the outside of the turret set below and substantially parallel to the camway 76 to engage the rollers 70 on the fingers 69 and thereby move the sleeve 45 upwardly to the same degree, after the spinner 42 is moved upwardly by the camway 76, without relative movement therebetween. However, to prevent pre-stripping of the cone before the spinner reaches a position above the chute 78 at the discharge station the entrance point of the track 79 is set slightly in advance of the entrance point of the camway 76 in order to elevate the sleeve 45 slightly above the upper edge of the cone on the spinner before the corresponding cam roller 75 engages the camway 76. Thereafter, the vertical displacement of the rollers effected by the stationary track 79 and camway 76 are identical so that the sleeve 45 moves upwardly simultaneously with the spinner 42.

At a point directly above the chute 78, the track 79 terminates, as a result of which the roller 70 riding thereon and the sleeve 45 to which it is attached falls relative to the spinner and forces the cone free, whereby it falls down onto the chute and is carried away. To provide a positive action at this point without depending solely upon the force of gravity, a hold down arm 80 is mounted on and extends from a bracket 81 of a stationary member 82. The arm 80 has an arcuate surface 83 directly above the chute 78 which engages the upper side of the rollers 70 as they pass beyond the end of the track 79 and thereby provides a positive downward movement for the sleeves 45 relative to the spinners against the cones to insure the stripping action at that point. The bracket 81 also serves to support the end of the track 79 and is attached to an extension arm 84 thereof by bolts 85, substantially as shown in FIG. 11.

In FIG. 19 there is illustrated the shape of a wafer that has been found to produce a satisfactory cone in accordance with this invention and to provide the characteristics deemed important for the purposes indicated. The cone, as illustrated on a large scale in FIGS. 17 and 18, characterizes the important features of the rim 61 and the overlapping of the ends 86 and 87 of the wafer in forming the cone at the upper edge of the cone along a substantial distance of the circumference of the rim in order to provide a strong structure. This is in contrast to the conventional molded cones as illustrated in FIGS. 15 and 16 where the overlapping at the rim is at a point 88. This latter condition contributes markedly to the weakness of the rim of the conventional cone, especially in the absence of a beaded edge.

The modified embodiment of the invention is illustrated in FIGS. 20–28 and it differs essentially from the first embodiment illustrated and described above in the substitution of a flanged cup member 89 for the sleeve 45 and cap 48.

The cup 89 is disposed on the upper end of the spinner 90 and it is adapted to enter the upper end of the female die part 91 with its annular flanged portion 96 thereabove. It is attached to the spinner 90 for rotation therewith by means of vertical slots 92 in the wall of the cup slidably engaging pins 93 secured to and projecting from the wall of the spinner.

The modified embodiment further differs from the previous embodiment in the provision of a gang of rollers 94 along the bottom of the hold down bar 95 at the wafer transfer station to engage the flange 96 and a roller 97 at the bottom of the arm 98 at the receptacle discharge station.

In the modified embodiment the cup 89 rotates with the spinner 90 and by means of the slotted connection thereto can be shifted thereon in an amount sufficient to strip the cones from the spinners.

Figure 29:
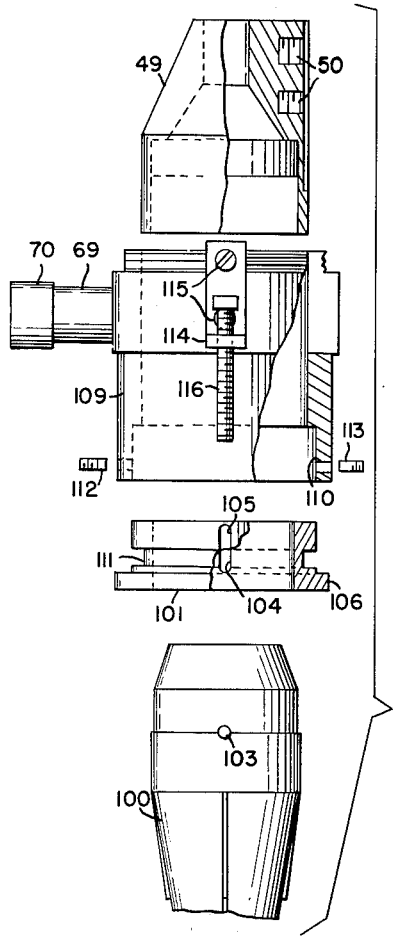
FIG. 29 is an exploded view with portions broken away of parts of a roller unit forming a second modified embodiment of the invention.
Figure 30:
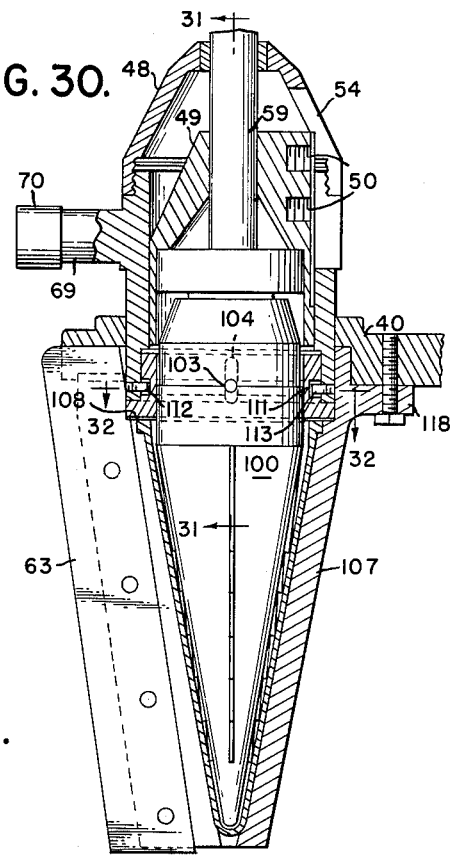
FIG. 30 is a vertical sectional view of the parts of FIG. 29 assembled with the female die part.
Figure 31:
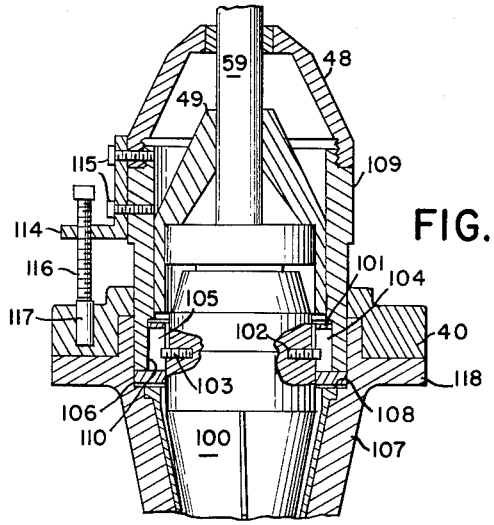
FIG. 31 is a vertical sectional view along the line 31—31 of FIG. 30.
Figure 32:
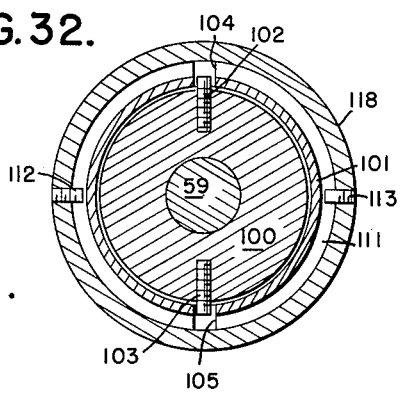
FIG. 32 is a cross-sectional view along the line 32—32 of FIG. 30.

The rolling unit of FIGS. 29 to 32 incorporates some features of both of the previously described embodiments and comprises the spinner core 100 to which there is attached an insert collar 101 by means of pins 102, 103 engaging vertical slots 104, 105 of the collar. The collar has a bottom annular flange 106 that fits in the upper end of the female mold part 107 on the upwardly facing annular shoulder 108. The lower end of the sleeve 109 has an annular recess portion 110 in the interior side to receive the portion of the collar 101 above the flange 106. An annular groove 111 on the periphery of the collar above the flange engages the inner ends of pins 112, 113 threadedly attached to the sleeve and projecting inwardly therefrom. The diameters of the pins 112, 113 are less than the width of the groove 111 to permit a small amount of relative vertical movement.

To the exterior of the sleeve 109 there is secured an L-shaped bracket 114 by means of bolts 115. The horizontal arm of the bracket carries a vertical screw 116 with which it is threadedly engaged directly above an abutment pin 117 set in the turret bracket 40 above the flange 118 of the female mold part 107.

The remaining parts of the rolling unit of this second modified embodiment are essentially the same as those of the first embodiment and they are designated by common numerals to facilitate an understanding thereof.

The arrangement of parts of the second modified embodiment as explained above permits the collar 101 to be carried up and down with the sleeve 109 while being attached and spinning with the spinner core 100. The sleeve is thus raised off the cone when the roller 70 enters the track 79 to prevent prestripping and the stripping action subsequently follows when it moves downward with the sleeve at the discharge station.

Having thus described my invention, I claim:

1. In a machine for manufacturing rolled containers from pastry wafers, said machine comprising a wafer baking unit and a rotatable turret, said turret being disposed adjacent the baking unit and having a rolling unit adapted to receive, as the turret rotates, a baked wafer from the baking unit at a transfer station and roll it into the shape of the container for discharge at a discharge station, said rolling unit comprising a female die part having an opening at its top secured to the turret, a rotatable male die part mounted on the turret for reciprocation between a position within the female die part and a position elevated from and on the exterior of said female die part, an annular abutment member in the said opening between the die parts against which a portion of the wafer is pressed to shape the upper edge of the container, means for moving said male die part and member upwardly on said turret simultaneously while the rolling unit is carried by the turret between the transfer station and the discharge station, and means at said discharge station for moving the said member downwardly relative to the male die part.

2. A machine as defined by claim 1 in which the member comprises a cylindrical shell having a lower edge adapted to be removably disposed in the top of the female die part, and means for moving the shell vertically relative to and independent of the male die part.

3. A machine as defined by claim 2 in which the means for moving the shell vertically comprises a member integral with and extending laterally from the shell and a stationary track on the machine between the transfer and discharge stations, said track being disposed to engage said integral member as the turret rotates and move it upwardly.

4. A machine as defined by claim 3 in which the track terminates at said discharge station to permit the shell to move downwardly relative to the male die part.

5. A machine as defined by claim 4 and a stationary element at said discharge station to engage the said integral member at the top and force it downwardly relative to the male die part.

6. A machine as defined by claim 3 in which the integral member comprises an arm projecting laterally from the shell.

7. A machine as defined by claim 3 in which the integral member comprises a flange extending laterally from the shell, said shell being slidably mounted on the male die part for relative vertical movement thereon and means limiting the vertical movement of the shell relative to the said male die part.

8. A machine as defined by claim 3 and means at said transfer station for holding the member down relative to the female die part.

9. A machine as defined by claim 3 and a stationary bar at said transfer station for engaging the integral member and urging it downwardly relative to the female die part.

10. In a machine for manufacturing rolled containers from pastry wafers, said machine comprising a wafer baking unit and a rotatable turret, said turret being disposed adjacent the baking unit and having a rolling unit adapted to receive, as the turret rotates, a baked wafer from the baking unit at a transfer station and roll it into the shape of the container for discharge at a discharge station, said rolling unit comprising a female die part having an opening at its top secured to the turret, a rotatable male die part mounted on the turret for reciprocation between a position with the female die part and a position elevated from and on the exterior of said female die part, said female die part having an annular upwardly facing shoulder in said opening, a member adapted to be removably disposed in said opening and having an annular edge adapted to seat on said shoulder, a marginal portion of said annular edge extending inwardly from said shoulder to form a downwardly facing abutment between the die parts against which a portion of the wafer is pressed during formation of the container to shape the upper edge of the container, means for moving said male die part and member upwardly on said turret simultaneously while the rolling unit is carried by the turret between the transfer station and the discharge station, and means at said discharge station for moving the said member downwardly relative to the male die part.

11. A cone rolling unit as defined by claim 10 and means for limiting the axial movement of the member relative to the male die part.

12. A cone rolling unit as defined by claim 10 in which the member is attached to the male die part by means of pins in one slidably engaging slots in the other parallel to the longitudinal axes of the die parts.

13. A cone rolling unit comprising an inverted conical female mold die part having an opening at its top, a conical male die part rotatably disposed within the female die part, a collar on the upper end of the said male die part within the female die part, said collar being connected to the male die part by means of pins in one engaging vertical slots in the other, a vertical cylindrical member having its lower end disposed between said collar and the wall of said female die part and its upper end extending above said female die part, and means permitting relative vertical displacement and relative rotation connecting the collar to the cylindrical member.

14. A cone rolling unit comprising an inverted conical female mold die part having an opening at its top, a conical male die part rotatably disposed within the female die part, a collar on the upper end of the said male die part within the female die part, said collar being connected to the male die part by means of pins in one engaging vertical slots in the other, a vertical cylindrical member having its lower end disposed between said collar and the wall of said female die part and its upper end extending above said female die part, said collar having an annular groove at its periphery adjacent the said lower end of the cylindrical member, and pins secured to and projecting from the cylindrical member in said groove, said pins being narrower than the groove.

15. A cone rolling unit comprising a female mold die part having an inverted conical bottom portion and a cylindrical upper portion, a male die part rotatably disposed in the female die part, said male die part comprising a lower inverted conical portion and an upper cylindrical portion, an annular member between said cylindrical portions, said member having a downwardly facing edge extending from one cylindrical portion to the other when the conical bottom portion of the male die part is disposed in the conical bottom portion of the female die part, and means for moving said member and male die part axially relative to each other and relative to said female die part.

References Cited in the file of this patent

UNITED STATES PATENTS

| | | |
|---|---|---|
| 1,015,400 | Renaud | Jan. 23, 1912 |
| 1,028,035 | Lanier | May 28, 1912 |
| 1,708,988 | Roberts | Apr. 9, 1929 |
| 1,906,640 | Shivek | May 21, 1933 |
| 1,915,210 | Balton | June 20, 1933 |
| 2,628,576 | Finke | Feb. 17, 1953 |
| 2,691,947 | Heyman | Oct. 19, 1954 |
| 2,774,315 | Heyman | Dec. 18, 1956 |